United States Patent Office 3,652,571
Patented Mar. 28, 1972

3,652,571
PRODUCTION OF 2,4-DIHYDROXYQUINOLINES
Hans Juergen Sturm, Grunstadt, and Helmut Goerth, Ludwigshafen, Germany, assignors to Badische Anilin- & Soda-Fabrik Aktiengesellschaft, Ludwigshafen (Rhine), Germany
No Drawing. Filed May 22, 1969, Ser. No. 827,020
Claims priority, application Germany, May 22, 1968, P 17 70 482.4
Int. Cl. C07d 33/38
U.S. Cl. 260—289 R  4 Claims

ABSTRACT OF THE DISCLOSURE

Production of 2,4-dihydroxyquinolines or derivatives thereof starting from benzoxazinones and using a strong base.

---

This invention relates to the production of 2,4-dihydroxyquinolines.

We have found that compounds having the general formula:

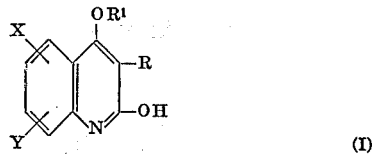

(I)

where R denotes a hydrogen atom or an electron attracting group $R^1$ denotes a hydrogen atom or an alkali metal atom, X denotes a hydrogen atom, a halogen atom, a nitro group, an alkyl group, an unsubstituted phenyl group or a substituted phenyl group, and Y denotes a hydrogen or halogen atom or an alkyl group, and X and Y may also be part of a condensed unsaturated ring system are obtained by reacting a compound having the general formula:

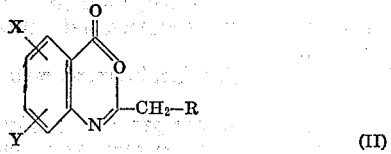

(II)

where X, Y and R have the meanings given above with a strong base.

In addition to hydrogen and nitro, the substituents X may be for example chlorine, bromine, fluorine, methyl, ethyl, isopropyl, phenyl, chlorophenyl, methylphenyl or nitrophenyl. Y may denote for example hydrogen, chlorine, bromine, methyl, ethyl or propyl. X and Y together may denote part of a condensed unsubstituted or substituted benzene ring. Preferred substituents X and Y are hydrogen, chlorine and nitro. The substituents X and Y are preferably in the 6-, 7- or 8-position of the compounds of Formula I.

Groups R which attract electrons are for example acyl groups such as acetyl, propionyl, benzoyl or nitro benzoyl, or nitro, sulfonyl alkylsulfonyl or cyano groups. Apart from hydrogen, it is preferred to use as groups R acetyl, cyano, benzoyl and substituted benzoyl. Examples of alkylsulfonyl groups are methylsulfonyl and ethylsulfonyl.

The alkali metal atom $R^1$ is potassium or preferably sodium.

Examples of suitable strong bases are alkali metal alkoxides or alkali metal salts of organic amines. Examples are sodium methoxide, potassium methoxide sodium ethoxide, potassium ethoxide, lithium piperidide or sodium piperidide.

Some of the compounds having the Formula II (benzoxazinones-4) to be used as starting materials are known from the literature. They may be prepared by acylation of o-aminoarylcarboxylic acids and subsequent elimination of water in an acid medium.

Preferred benzoxazinones-4 have the general formula:

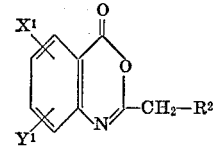

where $R^2$ denotes a hydrogen atom or a cyano, acetyl, benzoyl or nitrobenzoyl group, $X^1$ denotes a hydrogen or chlorine atom or a nitro group and $Y^1$ denotes a hydrogen or chlorine atom.

In the reaction of the benzoxazinones-4 with strong bases according to this invention, the components may be reacted with each other in the ratio 1:1, but a slight excess of the base is advantageous. A large excess is also possible.

All compounds conventionally used as solvents are suitable as solvents or diluents for the reaction provided they do not react with the reagents.

Examples of suitable solvents are aliphatic or aromatic hydrocarbons, high boiling ethers, N,N-disubstituted amides or halobenzenes. Specific examples are dimethylcyclohexane, dichlorobenzene, benzonitrile, diethylene glycol dimethyl ether, dimethyl sulfoxide, N-methylpyrrolidone and preferably toluene, xylene or dimethylformamide. When R in Formula I does not denote hydrogen, alcohols such as methanol or ethanol may also be used as solvents.

An advantageous method of carrying out the new reaction consists for example in placing the benzoxazinone derivative having the Formula II in a solvent or diluent at the reaction temperature or a somewhat lower temperature, adding the base at such a rate that the reaction does not become too vigorous, keeping the whole for some time at the reaction temperature and then cooling it. The dihydroxyquinoline derivative corresponding to the reaction product is then isolated in the form of the (alkali metal) salt or by acidification as the free acid. The reaction period is from a few minutes to about one hour. The reaction temperature may be from room temperature to about 200° C., preferably from 60° to 150° C. It is an advantage of the new process that the production of the benzoxazinone and the reaction with the base may take place in the same reactor.

As compared with prior art methods for making 2,4-dihydroxyquinoline (reaction of acetylanthranilic acid with sodamide in a melt of sodium hydroxide and potassium hydroxide at temperatures of from 150° to 180° C., v. Bios, 1153, 323) or 3-acetyl-2,4-dihydroxyquinoline (reaction of methyl acetoacetylanthranilate with metallic sodium in toluene at refluxing temperature, see J. Chem. Soc. (London), 1954, 850), the new process is more widely applicable and uses substantially milder reaction conditions.

The invention is illustrated by the following examples. The parts and percentages specified in the following examples relate to weight.

EXAMPLE 1

65 parts of 2-methylbenzoxazinone-4 is heated in 400 parts of xylene at 110° to 120° C. and in about fifteen minutes 25 parts of solid sodium ethylate is added. The mixture is then heated to 130° to 140° C. and kept at this temperature for forty-five minutes, some of the solvent thus being distilled off. The mixture is then cooled to room temperature and the reaction product is suction filtered. The filter cake is added to 1500 parts of water and boiled up so that is passes completely into solution. A pH of from 5 to 6 is set up by adding acid and then the deposited precipitate is suction filtered while hot and dried. 39 parts of 2,4-dihydroxyquinoline is obtained.

EXAMPLE 2

65 parts of sodium piperidide is heated to 80° C. in 100 parts of toluene and then a solution of 80 parts of 2-methylbenzoxazinone-4 in 300 parts of toluene is gradually added. The whole is then heated for seventy minutes at boiling point under reflux, after which the solvent is distilled off. The residue is dissolved hot in about 230 parts of dilute caustic soda solution and filtered. The solution is cooled and the reaction product is isolated. The solution is cooled and the reaction product is isolated. 55 parts of 2,4-dihydroxyquinoline is obtained as the sodium salt.

EXAMPLE 3

70 parts of anthranilic acid is added in portions to 115 parts of acetic anhydride at from 100° to 120° C. The mixture is boiled and the acetic acid formed is distilled off with the excess acetic anhydride. 20 parts of calcined soda and 500 parts of xylene are added to the residue. The whole is heated to 110° to 120° C. and 34 parts of industrial sodium methylate is introduced. The mixture is kept boiling for one hour, some of the liquid thus distilling off. After having been cooled, the whole is suction filtered and the filter cake is dissolved hot in about 1000 parts of water. Another filtration is carried out if necessary and a pH of from 5 to 6 is set up in the solution with hydrochloric acid. The deposited precipitate is suction filtered hot and dried. 32 parts of 2,4 - dihydroxyquinoline is obtained. 26 parts of a mixture of acetylanthranilic acid and anthranilic acid can be obtained from the filtrate by setting up a pH of 3, cooling and filtration; this can be used again as starting material.

EXAMPLE 4

100 parts of 2 - acetonylbenzoxazinone - 4 (obtained from anthranilic acid, diketene and acetic anhydride in carbon tetrachloride) is dissolved in 800 parts of methanol. 110 parts of technical 30% sodium methylate solution in methanol is allowed to flow in slowly into the said solution while under reflux. The reaction mixture is kept at boiling temperature for sixty minutes and then the bulk of the solvent is distilled off. The residue is dissolved at the boil in the exact amount of water required and the solution is brought to a pH of from 5 to 6. After cooling, suction filtration and drying, 83 parts of 3 - acetyl - 2,4 - dihydroxyquinoline having a melting point of from 249° to 251° C. is obtained.

EXAMPLE 5

12.5 parts of 2 - acetonyl - 7 - nitrobenzoxazinone - 4 (obtained from 4-nitroanthranilic acid and an excess of diketene in glacial acetic acid) is dissolved in 250 parts of methyl glycol. 4 parts of sodium methylate is added in portions to the boiling solution. The color of the solution changes from yellow to violet and a short time later to orange, a precipitate being formed. The solution is kept boiling for another three minutes, cooled to room temperature and the precipitate is suction filtered. The filter cake is suspended in water and the mixture adjusted to a pH of from 4 to 5 with hydrochloric acid. After suction filtration, washing until neutral and drying, 9.2 parts of 3 - acetyl - 7 - nitro - 2,4 - dihydroxyquinoline is obtained having a melting point (recrystallized from methyl glycol) of 288° to 290° C.

EXAMPLE 6

18.6 parts of 2 - cyanomethylbenzoxazinone - 4 (obtained from cyanoacetylanthranilic acid and acetic anhydride) is dissolved in isopropanol and while boiling a solution of 2.5 parts of sodium in isopropanol is added dropwise. The solution is kept boiling for another fifty minutes and the bulk of the solvent is then distilled off. The residue is taken up in 1 part by volume of boiling water, the whole passing into solution when a few drops of caustic soda solution is added. The mixture is acidified with dilute hydrochloric acid until the first persisting precipitate occurs. After cooling, suction filtration and drying, 14.2 parts of 3 - cyano - 2,4 - dihydroxyquinoline having a melting point (after reprecipitation while hot) of 292° to 294° C. is obtained.

EXAMPLE 7

13.6 parts of 6,8 - dichloro - 2 - acetonyl - benzoxazinone-4 (prepared by reacting 3,6 - dichloroanthranilic acid with diketene in dry dichlorobenzene and cyclizing the product with acetic anhydride) is stirred in 80 parts of methanol and at 50 to 60° C. a solution of 4 parts of sodium methylate in methanol is dripped in. The whole is stirred for 60 minutes at 50 to 60° C. and then approx. 200 parts of water is added. The mixture is adjusted at approx. 40 to 50° C. to pH 3 to 4 with hydrochloric acid, stirred for 30 minutes, allowed to cool to room temperature and filtered. The filtrate is washed successively with water, methanol, acetone and ether and then dried. 11.75 parts of 6,8 - dichloro - 2,4 - dihydroxy-3-acetylquinoline is obtained; M.P. (from dimethylformamide) 303 to 306° C.

We claim:
1. A process for the production of a compound of the formula

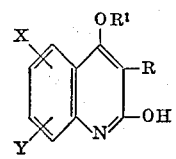

wherein
R is hydrogen, nitro, alkylsulfonyl, cyano, acetyl, propionyl, benzoyl or nitrobenzoyl,
$R^1$ is hydrogen, sodium or potassium,
X is hydrogen, chlorine, bromine, nitro, methyl, ethyl, i-propyl, phenyl, methylphenyl, nitrophenyl or chlorophenyl,
Y is hydrogen, chlorine, bromine, methyl, ethyl or propyl and
X and Y together are part of a condensed benzene ring, which process comprises reacting a compound having the formula

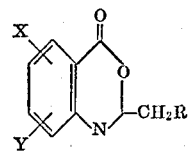

where R, X and Y have the meanings given above, with a base selected from the class consisting of alkali metal alkoxides and alkali metal salts of organic amines.

2. A process as claimed in claim 1, wherein a compound having the formula

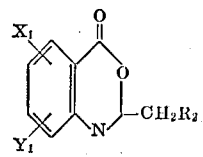

wherein
$R^2$ is cyano, acetyl, benzoyl or nitrobenzoyl,
$X^1$ is hydrogen, chlorine or nitro and
$Y^1$ is hydrogen or chlorine, is reacted with a strong base selected from the class consisting of sodium methoxide, potassium methoxide, sodium ethoxide, potassium ethoxide and sodium piperidide.

3. A process as claimed in claim 1 wherein the reaction is carried out at a temperature of from room temperature up to about 200° C.

4. A process as claimed in claim 1 wherein the reaction is carried out at a temperature of from 60° C. to 150° C.

References Cited
UNITED STATES PATENTS

| | | | |
|---|---|---|---|
| 3,328,397 | 6/1967 | Bell | 260—244 |
| 3,450,700 | 6/1969 | Salaigh | 260—244 |

DONALD G. DAUS, Primary Examiner

U.S. Cl. X.R.

260—244, 283 SY, 283 CN

PO-1050
(5/69)

UNITED STATES PATENT OFFICE
CERTIFICATE OF CORRECTION

Patent No. 3,652,571    Dated March 28, 1972

Inventor(s) Hans-Juergen Sturm and Helmut Goerth

It is certified that error appears in the above-identified patent and that said Letters Patent are hereby corrected as shown below:

Column 1, line 3, "Grunstadt" should read -- Gruenstadt --; line 31, "group R¹" should read -- group, $R^1$ --.

Column 2, line 66, "ethylate" should read -- methylate --.

Column 3, line 1, "is" should read -- it --.

Column 3, lines 14 to 15, cancel "The solution is cooled and the reaction product is isolated ".

Signed and sealed this 5th day of December 1972.

(SEAL)
Attest:

EDWARD M. FLETCHER, JR.            ROBERT GOTTSCHALK
Attesting Officer                  Commissioner of Patents